United States Patent [19]

Sessions et al.

[11] Patent Number: 4,817,261

[45] Date of Patent: Apr. 4, 1989

[54] ROTARY SNAP MACHINE

[75] Inventors: Robert W. Sessions, Hinsdale; Richard A. Rodzen, Bollingbrook, both of Ill.

[73] Assignee: Ferris Manufacturing Company, Burr Ridge, Ill.

[21] Appl. No.: 149,109

[22] Filed: Jan. 26, 1988

[51] Int. Cl.$^4$ .................. B21D 39/03; B27F 7/17
[52] U.S. Cl. ..................... 29/429; 29/522.1; 227/81
[58] Field of Search ............. 29/429, 522.1; 227/81

[56] References Cited

U.S. PATENT DOCUMENTS

| 283,923 | 8/1883 | Root | 227/81 |
|---|---|---|---|
| 637,779 | 11/1899 | Groeschel | 227/81 |
| 677,711 | 7/1901 | Stapf | 227/81 |
| 686,738 | 11/1901 | Kaschenbach | 227/81 |
| 1,193,113 | 8/1916 | Brown | 227/81 |
| 1,518,065 | 12/1924 | Hall | 227/81 X |
| 1,918,961 | 7/1933 | Foster | 493/4 X |
| 3,013,693 | 12/1961 | Griner | 493/4 X |
| 3,323,274 | 6/1967 | Justus | 53/30 |
| 3,367,550 | 2/1968 | Jeziersri | 227/81 X |
| 3,724,339 | 4/1973 | Metzinger et al. | 493/4 |
| 3,837,378 | 9/1974 | Kanki et al. | 141/146 |
| 4,256,250 | 3/1981 | LeBlanc | 227/81 X |
| 4,315,588 | 2/1982 | Faltin | 227/81 |
| 4,547,645 | 10/1985 | Smith et al. | 219/10.67 |

Primary Examiner—Paul A. Bell
Attorney, Agent, or Firm—Leydig, Voit & Mayer

[57] ABSTRACT

A machine for manufacturing a stud and eyelet assembly in a web that moves continuously between the eyelet die wheel and the stud die wheel. The eyelet magazine continually supplies eyelets from an eyelet hopper to the eyelet transfer wheel, which in turn continually supplies the eyelets to the eyelet die wheel. Likewise, the stud magazine continually supplies studs from a stud hopper to the stud transfer wheel, which in turn continually supplies studs to the stud die wheel. The eyelet or stud is held on the die of the die wheel and the stripper of the transfer wheel by a vacuum. The vacuum is applied from a vacuum source through ports in each wheel to the die or stripper interface with the eyelet or stud. The vacuum in a transfer wheel operates from the point it receives an eyelet or stud from the magazine until the point where the eyelet or stud in transferred to the die wheel. Similarly, the vacuum in a die wheel operates from the point it receives the eyelet or stud from the transfer wheel to the time the eyelet and stud are assembled in the web at the nip. A single drive input rotates a gear at the base of one wheel, which in turn synchronously rotates the other wheels through a gear train at the wheel bases.

21 Claims, 6 Drawing Sheets a — ELASTIC ZONE OF DEFORMATION
b — PLASTIC ZONE OF DEFORMATION
c — ELASTIC LIMIT AS MEASURED BY THE YIELD STRENGTH

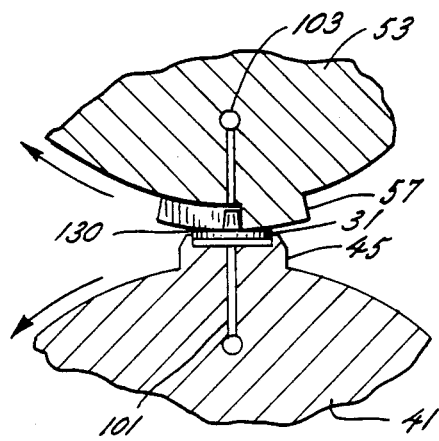
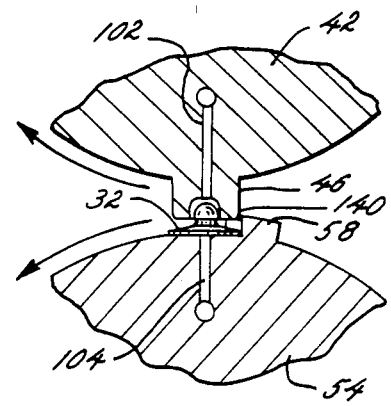
FIG. 8
FIG. 9
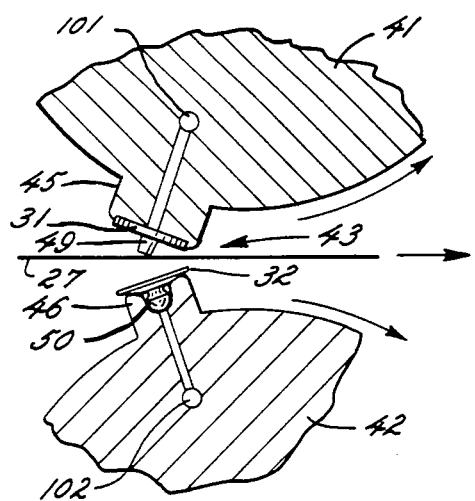
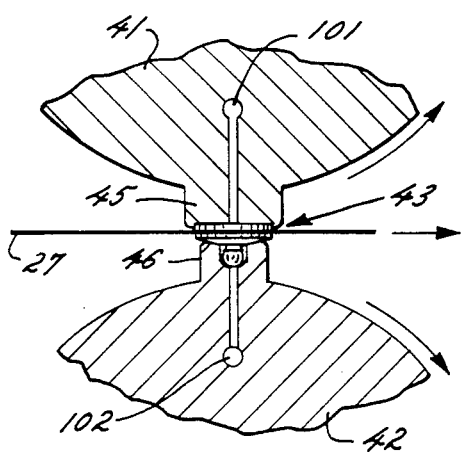
FIG. 10A
FIG. 10B

ROTARY SNAP MACHINE

FIELD OF THE INVENTION

The present invention relates generally to machines for assembling snaps and more particularly concerns machines for assembling snaps in a continuously moving web.

BACKGROUND OF THE INVENTION

Stud and eyelet assemblies or snaps are used in a variety of products ranging from clothing to medical applications. Generally, the stud and the eyelet are assembled in a web by a punch advance method. In assembly, a web is moved into position on a punch press and stopped. The punch is activated to assemble and engage the stud and the eyelet through the web. The web with the snap assembly is then advanced out of the punch press. A new section of web is moved into position on the punch press and the assembly process is repeated.

While this widely used stop-action type of assembly has been effective in its application in the past, it is relatively complicated, labor intensive, and time-consuming. More importantly, this method cannot be used for assembling and engaging the post of an eyelet in a stud in a continuously advancing web of a more efficient continuous line method. Consequently, the stop action method of assembling is unsuitable for the highly automated, high output manufacturing demanded by industries in increasingly competitive markets.

OBJECTS OF THE INVENTION

It is the primary aim of the invention to provide an apparatus and a method by which a stud and an eyelet may be assembled and deformed to form a unitary structure in a moving web.

Another object of the invention is to provide an economical operation that is time efficient and has low labor and maintenance requirements. A further object is to provide a simplified assembly method.

An additional object is to provide an apparatus that may be synchronously coupled to a web processing machine and may be operated at any position in such a web processing machine.

It is a more detailed object to provide a rotary device that utilizes a vacuum for the retention of eyelets and studs on dies prior to assembly in a continuously moving web. In order for the eyelet and the stud to be assembled and engaged in a web that is moving continuously, the web moves through the nip between synchronously rotating eyelet and stud die wheels that assemble the eyelet and stud in the web. In this way, the eyelet and the stud are assembled and deformed in a continuous rolling motion as the die wheels rotate to form an integral structure with the web. To maintain a constant, ready supply of eyelets and studs for efficient and therefore economical operation, the eyelet and the stud are positioned on the respective die wheels by dies, which are uniformly spaced about the peripheries of the wheels. To retain the eyelets and studs on the die wheels, the invention provides for a suction means, which is applied through a port in the die to the interface of the die with the eyelet or stud. In order to synchronously rotate the wheels, and allow the apparatus to be operated at any position in a web processing machine, the invention provides a drive means that imparts rotation to the drive gear of one wheel, which further transmits rotation to the drive gear of the other wheel. This rotary invention provides a simplified method of assembly, which is readily suited for highly automated fabrication operations.

BRIEF DESCRIPTION OF THE DRAWINGS

These and other features and advantages of the invention will be more readily apparent upon reading the following description of a preferred exemplified embodiment of the invention and upon reference to the accompanying drawings wherein:

FIG. 6A is an enlarged, fragmentary, front cross-sectional view of a stud in the stud magazine at the stud transfer wheel taken along line 7A—7A in FIG. 7B.

FIG. 8 is an enlarged, fragmentary, front cross-sec view of the eyelet transfer point at the eyelet transfer and die wheels.

FIG. 9 is an enlarged, fragmentary, front cross-sectional view of the stud transfer point at the stud transfer and die wheels.

FIG. 10A is an enlarged, fragmentary, front cross-sectional view of the eyelet and stud on the die wheels approaching the web at the nip for assembly.

FIG. 10B is an enlarged, fragmentary, front cross-sectional view of the eyelet and the stud assembled and engaged in the web at the nip.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
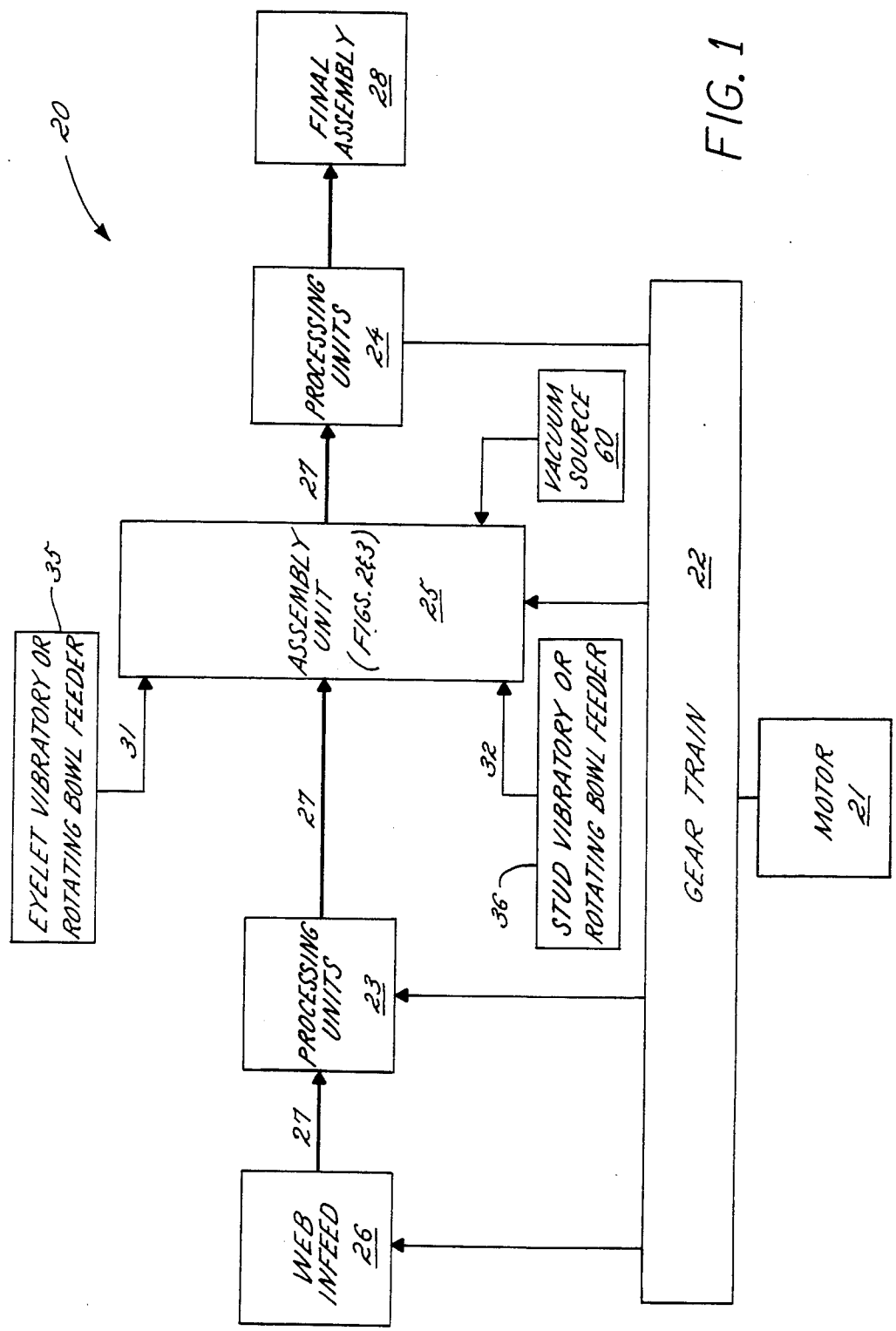
FIG. 1 is a schematic view of an apparatus embodying the invention shown in FIGS. 2 and 3.

Turning now to the drawings, FIG. 1 shows a schematic view of a conventional web processing machine 20, well known in the industry of manufacturing electrodes. The machine 20 comprises a motor 21 that drives a gear train 22 of conventional design. The gear train 22 further drives the individual processing units 23, 24, 25 and the web infeed 26 of the machine 20. A web 27 is supplied to the stations or processing units 23, 24, 25 of the machine 20 from the web infeed 26. The web 27 may be made of any material as required by the intended usage of the final assembly 28. For example, the web may be composed of nylon, polyvinylchloride, or polyethylene foam. At the processing units 23, 24, 25 various operations are performed on the web 27, such as applying support materials to the web material 27, or cutting the final assembly 28 from the web 27. At one such unit 25, eyelets 31 and studs 32, or snap components, are assembled and deformed such that they become an integral part of the web 27. These eyelets 31 and studs 32 may be delivered to the the assembly unit 25 from conventional feeding devices 35, 36 such as vibratory or rotating bowl feeders.

In accordance with the present invention, the stud and eyelet assembly unit 25 comprises synchronously rotated eyelet and stud die wheels which assemble and deform the components in a web moving continuously through the nip formed between the two wheels. The stud die wheel and the eyelet die wheel have dies spaced about the circumference of the wheels. Each of the wheels is continuously supplied with either studs or eyelets. A suction means applied through the dies holds the studs and the eyelets on the dies until they reach the assembly point at the nip. At the nip, the eyelet and the stud are assembled and deformed to form an integral structure through the web by the rotary motion of the die wheels.

Figures 2, 3:
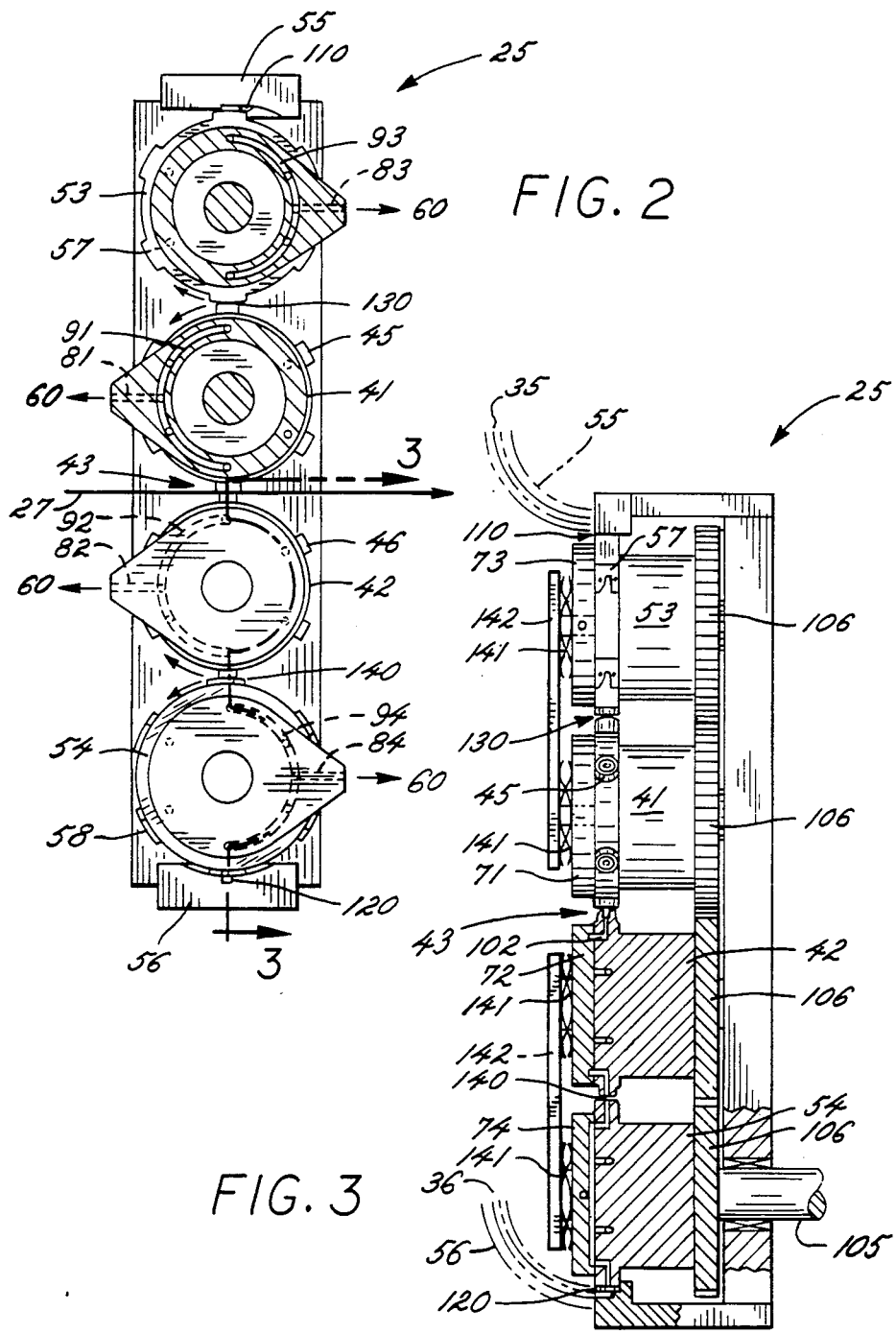
FIG. 2 is a front view of the invention, partially broken away.
FIG. 3 is a side view, partially sectioned along line 3—3 in FIG. 2.

In the detailed drawings of the assembly unit 25 shown in FIGS. 2 and , it may be seen that the eyelet die wheel 41 rotates in a counterclockwise direction, while the stud die wheel 42 rotates in a clockwise direction. As the die wheels 41, 42 rotate, the web 27 passes through the nip 43 formed between the two wheels 41, 42. So that the eyelets 31 and the studs 32 may be assembled and engaged in the web 27, the dies 45, 46 situated around the peripheries of the wheels 41, 42 synchronously rotate to the nip 43.

Figure 4:
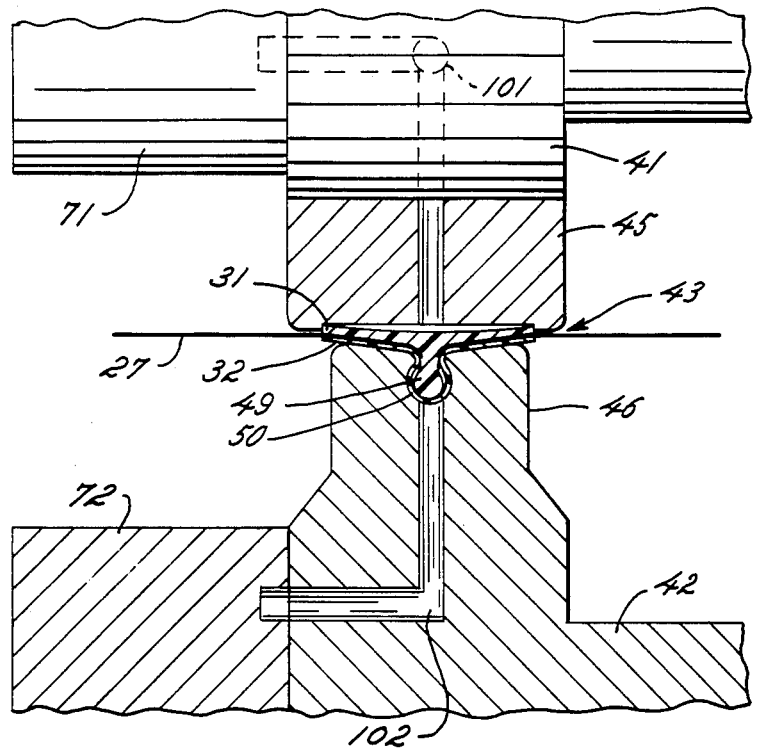
FIG. 4 is an enlarged, fragmentary view of the nip for the two center die wheels as shown in FIG. 3.

To form a unitary structure as shown in FIG. 4, the eyelets 31 and studs 32 as supported on these dies 45, 46 are assembled through the web 27 as the die wheels 41, 42 continuously rotate and the web 27 progresses continuously through the nip 43. It will be appreciated that while the web 27 may pause momentarily to facilitate further operations, such as cutting the final assembly 28 from the web 27 at another processing unit 24, the web 27 moves continuously through the processing machine 20 as opposed, for example, to an indexed or stop-action movement. In assembly, the post 49 of the eyelet 31 may pierce a hole in the web 27, enter a hole already punched through the web 27, or simply conform the web material to the shape of the post 49 and socket 50 mating, depending on the web material chosen.

In keeping with the invention, to achieve a single permanent assembly in the web 27, the post 49 may deform to take on the shape of the inside of the socket 50. In this way, the post 49 of the eyelet 31 deforms with the progressive rolling motion of the die wheels 41, 42 when it is assembled into the stud 32. Thus, the eyelet 31 and the stud 32 are both assembled and engaged at a single unit 25 of the web processing machine 20 without interfering with the continuous movement of the web 27 through the web processing machine 20.

Figure 5:
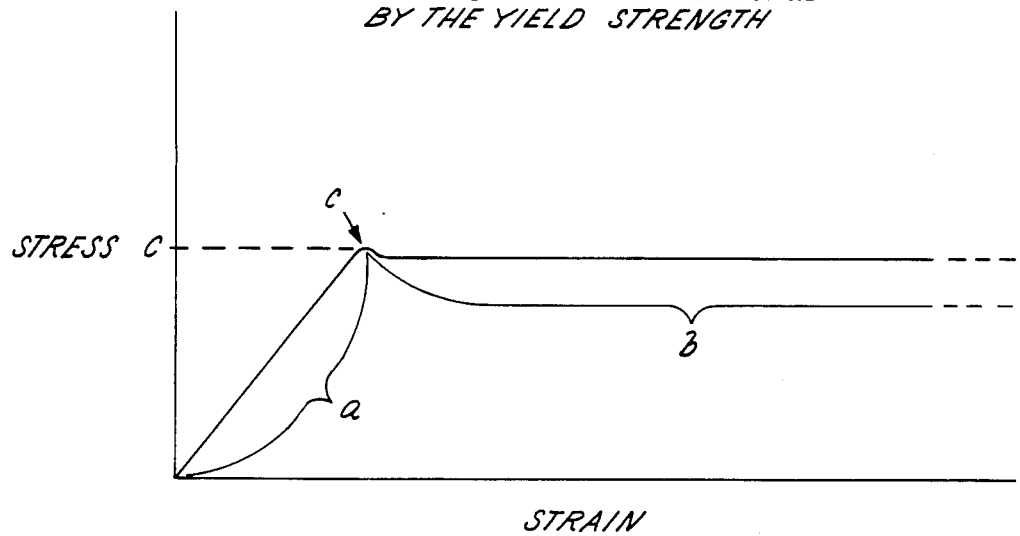
FIG. 5 is a stress-strain diagram of the eyelet and/or the stud material.

Preferably, in the assembly of the unitary structure in the web 27, the eyelet post 49 deforms plastically, as indicated by the zone designated b on the stress-strain diagram of FIG. 5. In this way, the induced stress exceeds the elastic limit c of the material, thereby resulting in a permanent deformation of post 49. By way of illustration, but not limitation, the stud 32 may be made of a suitable metal, such as, for example, stainless steel, nickel, tin, or plated brass. The eyelet 31 may also be made of a suitable metal, such as stainless steel, or it may be made of a suitable plastic, such as acrylonitrile-butadiene-styrene copolymer, Lexan ®, or the like. The plastic may also be coated with a metal to render the eyelet electrically conductive. In a preferred embodiment, the post 49 of the plastic eyelet 31 plastically deforms to take on the shape of the socket 50 of the stainless steel stud 32.

One skilled in the art will appreciate that the invention is not intended to be limited only to the plastic zone b of deformation, but is intended to include both temporary and permanent deformation of the eyelet 31 and/or the stud 32. Therefore, the invention includes the assembly of a stud 32 and an eyelet 31 through a web 27 where the eyelet post 49 is plastically deformed to conform to the stud socket 50, and also where the socket 50 or the post 49 merely elastically deforms to cause an interference fit, as indicated by the zone a in FIG. 5.

Returning now to FIGS. 2 and 3, it may be seen that the eyelets 31 and studs 32 are transported through the assembly unit 25 in the same manner. The eyelets 31 and studs 32 may be supplied to the die wheels 41, 42 by transfer wheels 53, 54. Conventional feeding devices 35, 36 such as vibrating or rotating bowl feeders orient and feed eyelets 31 and studs 32 to magazine columns 55, 56, which supply components 31, 32 to the strippers 57, 58 of the adjacent transfer wheels 53, 54. The components 31, 32 are held on the respective wheels 41, 42, 53, 54 by a vacuum 60 transmitted from vacuum distributor plates 71, 72, 73, 74 to the dies 45, 46 and transfer wheel strippers 57, 58 by a series of distributor ports 81, 82, 83, 84, distributor channels 91, 92, 93, 94 , and internal wheel ports 101, 102, 103, 104.

The wheels 41, 42, 53, 54 operate such that the eyelet transfer and die wheels 41, 53 rotate in a manner that is the mirror image of the rotation of the stud transfer and die wheels 42, 54. To maintain synchronicity between the wheels 41, 42, 53, 54, a single shaft 105 imparts rotation to one wheel 54 of the unit 25. This rotation is further transmitted to the remaining wheels 41, 42, 53 of the unit 25 through the meshing of gears 106 at the bases of the wheels 41, 42, 53, 54.

Figure 6A:
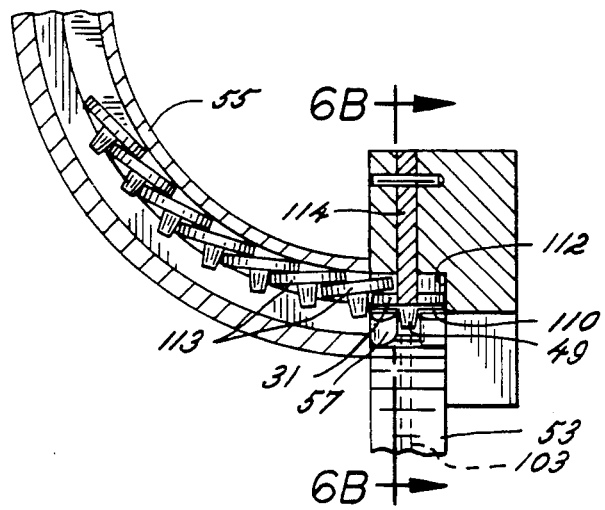
FIG. 6A is an enlarged, fragmentary, front cross-sectional view of an eyelet in the eyelet magazine at eyelet transfer wheel taken along line 6A—6A in FIG. 6B.
Figure 6B:
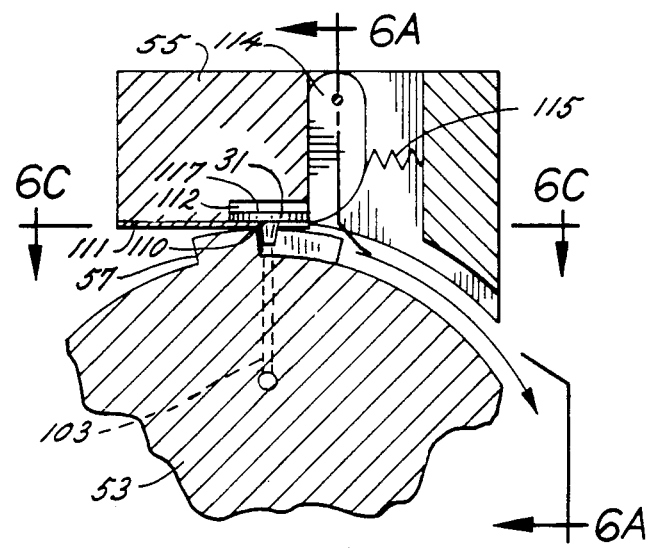
FIG. 6B is and enlarged fragmentary side cross-sectional view taken along line 6B—6B in FIG. 6A.

As shown in FIGS. 6A and 6B, the weight of the eyelets in the column 55 propels an eyelet 31 into a pickup position at a transfer point 110 at the base of the magazine column 55 adjacent to the eyelet transfer wheel 53. In order to provide support at the lower surface of the eyelet 31, a support plate 111 extends from the eyelet magazine into the opening at the base of the magazine column 55. The eyelet 31 is further positioned by the side edges of the magazine sidewall 112 and the column of eyelets 113. So that the weight of the column of eyelets 113 may not push the eyelet 31 out of the pickup position at the transfer point 110, a gate 114 is provided, which is biased against the eyelet 31 by a spring 115. To facilitate the engagement of the eyelet 31 for further transport through the system, the post 49 of the eyelet 31 extends down from the support plate 111 when the eyelet 31 is in position at the transfer point 110, as shown in FIGS. 6A and 6B.

Figure 6C:
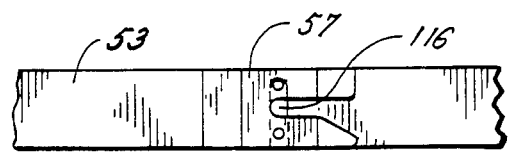
FIG. 6C is an enlarged, fragmentary top view of the eyelet transfer wheel showing the top view of an eyelet stripper taken along line 6C—6C in FIG. 6B.

In order to receive the eyelet 31 from the eyelet magazine 55, and to transport the eyelet 31 to the eyelet die wheel 41, the eyelet transfer wheel 53 is positioned adjacent to the eyelet magazine column 55. The eyelets 31 are held on the transfer wheel 53 by eyelet strippers 57 positioned about the periphery of the eyelet transfer wheel 53. As shown in FIG. 6C, the strippers are of a U-type shape, so that the center open area 116 may receive the post 49 of the eyelet 31. In this way, the stripper 57 engages the eyelet 31 from the magazine column 55 and properly orients the eyelet 31 for transfer to the eyelet die wheel 41.

When the eyelet transfer wheel 53 rotates, as shown in FIG. 6B, the inside surface 116 of the stripper 57 rotates into contact with the eyelet post 49 extending down from the support plate 111 at the transfer point 110 of the eyelet magazine 55. With further rotation of the transfer wheel 53, the inside surface 116 of the stripper 57 engages the eyelet post 49, forcing the post 49 and therefore the eyelet 31 from the stationary position on the eyelet support plate 111.

As the eyelet 31 moves with the stripper 57, it pushes against the gate 114 to pivot the gate 114 from its biased position. In order to prevent another eyelet 113 in the magazine column 55 from progressing to the transfer point 110 while the gate 114 is not properly set to support the eyelet 113 in the pickup position, the upper face of the stripper 57 blocks the post 49 of the next eyelet 113 in the magazine column 55. When the eyelet 31 on the stripper 57 moves past contact with the front edge of the gate 114, the gate 114 pivots back to its bias position to support the next eyelet 113. To assure that the eyelet 31 is adequately positioned on the stripper 57, the gate 114 brushes against the top surface 117 of the eyelet 31 and pushes the eyelet 31 against the stripper 57 as the gate 114 pivots back to its biased position.

The eyelet transfer wheel 53 with the eyelet 31 in position on the stripper 57 continues to rotate in a clockwise direction. After the stripper 57 has rotated past the transfer point 110 at the magazine 55 and the gate 114 has reset back to the bias position, the weight of the eyelets 113 in the magazine column 55 propels the next eyelet 113 into the transfer position 110 at the base of the column 55. In this way, the next eyelet 113 is in position for engagement with the next stripper 57 as the eyelet transfer wheel 53 continues to rotate.

Figure 7A:
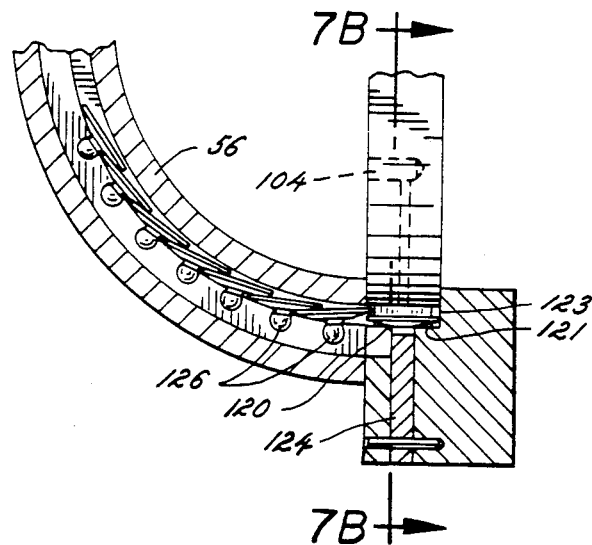
FIG. 7B is an enlarged, fragmentary, side cross-sectional view taken along line 7B—7B in FIG. 7A.
FIG. 7C is an enlarged fragmentary view of the stud transfer wheel showing a top view of a stud stripper taken along line 7C—7C in FIG. 7B.
Figure 7B:
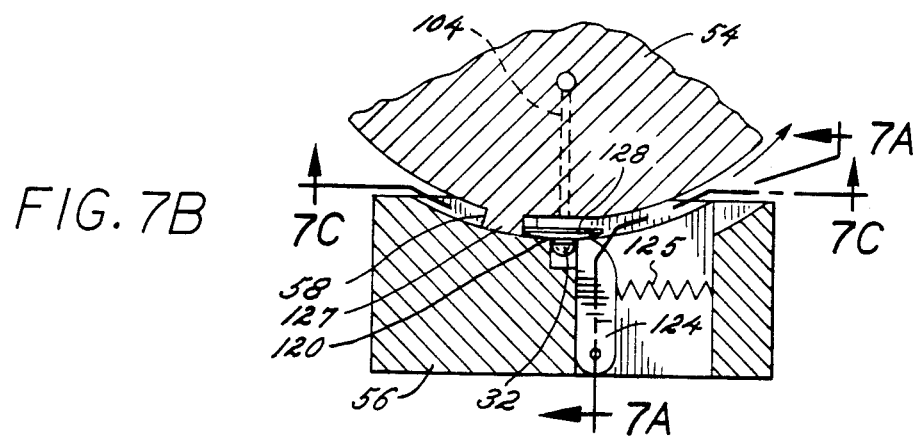

The stud 32 moves through the system in a manner similar to that described for the eyelet 31. As shown in FIGS. 7A and 7B, the weight of the studs in the magazine column 56 above propels a stud 32 into the pickup position at a transfer point 120 at the base of the magazine column adjacent the stud transfer wheel 54. To support the stud 32 along the lower edge, the wall 121 of the stud magazine 56 extends partially into the opening at the base of the column 56. The stud 32 is further positioned by the side 122 and back 123 wall of the magazine 56 at the opening. A gate 124 is biased against the stud 32 by a spring 125 and prevents the weight of the column of studs 126 from pushing the stud out of position, as shown in FIGS. 7A and 7B.

Figure 7C:
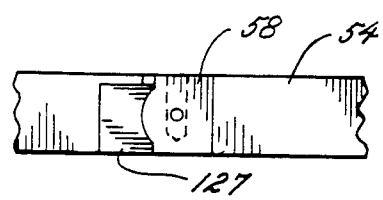

Stud strippers 58 positioned about the periphery of the stud transfer wheel 54 receive the studs 32 from the adjacent stud magazine column 56 and transport the studs 32 to the adjacent die wheel 42. In order for the stud stripper 58 to engage the stud 32 as it passes the transfer point 139, the stripper 58 has a section 127 that protrudes from the transfer wheel as shown in FIGS. 7B and 7C.

As the stud transfer wheel 54 rotates, the protruding section 127 of the stripper 58 rotates into contact with the flange 128 of the stud 32 at the transfer point 120 of the stud magazine 56, as shown in FIG. 7B. With further rotation of the stud transfer wheel 54, the surface of the stripper 58 engages the stud flange 128, forcing the stud 32 from the stationary position at the transfer point 120 at the column base.

Engaged by the stripper 58, the stud 32 pushes against the gate 124 to pivot the gate 124 from its biased position. As the wheel 54 rotates, the edge of the stripper 58 blocks the next stud 126 in the magazine column 56 to prevent its movement into the transfer point 120 while the gate 124 is not properly set to support the stud 126. When the stud 32 on the stripper 58 moves past contact with the front edge of the gate 124, the gate 124 brushes against the top of the socket 50 of the stud 32 and pushes the stud 32 against the stripper 58 as the gate 124 pivots backs to its biased position. In this way, the reset gate 124 supports and retains the next stud 126 propelled into the transfer position 120 at the base of the column 56 by the weight of the studs 126.

An eyelet die wheel 41 is positioned adjacent the eyelet transfer wheel 53, and a stud die wheel 42 is positioned adjacent the stud transfer wheel 54 to further transport the eyelets 31 and studs 32 through the assembly unit 25. The eyelets are transported by and moved between the eyelet transfer and die wheels 53, 41 in the same manner as the studs 32 are transported by and moved between the stud transfer and die wheels 54, 42. To receive the eyelets 31 and the studs 32 at the transfer points 130, 140 at the transfer wheels 53, 54, dies 45, 46 are spaced about the periphery of the die wheels 41, 42. These dies 45, 46 support and align the components 31, 32 as the die wheels 41, 42 rotate the eyelet 31 and stud 32 into position at the web 27 for assembly at the nip 43. As may be seen in FIGS. 2 and 3, the eyelet die wheel 41 and the stud die wheel 42 rotate in opposite directions so that the web 27 may be advanced between the wheels 41, 42 at the same peripheral speed.

Likewise, the eyelet transfer wheel 53 and the eyelet die wheel 41 rotate in opposite directions to facilitate the transfer of eyelets 31 between the wheels 53, 41. It will be appreciated that the eyelet transfer wheel 53 and the eyelet die wheel 41 synchronously rotate in the clockwise and counterclockwise directions, respectively. In this way, an eyelet 31 supported on a stripper 57 of the eyelet transfer wheel 53 and a die 45 of the eyelet die wheel 41 simultaneously rotate to the transfer point 130, as shown in FIG. 8. The eyelet 31 subsequently transfers from the stripper 57 to the die 45. The eyelet transfer wheel 53 continuously rotates in the clockwise direction while releasing the eyelet 31, and the eyelet die wheel 41 continues to rotate in the counterclockwise direction with the eyelet 31 in position on the die 45. The eyelet 31 remains in position on the die 45 until it is assembled into the web 27 at the nip 43, the die wheel 41 continuously rotating during assembly and after releasing the eyelet 31, as shown in FIGS. 10A and 10B.

Similarly, the stud transfer wheel 54 and stud die wheel 42 synchronously rotate in the counterclockwise and clockwise directions, respectively. As the stud supported on the stripper 58 of the stud transfer wheel 54 and the die 46 of the stud die wheel 42 simultaneously rotate into an adjacent position at the transfer point 140, the stud 32 transfers from the stripper 58 to the die 46, as shown in FIG. 9. Both the wheels 54, 42 continue to rotate, the stud 32 remaining in position on the die 46 until it is assembled with the eyelet 31 at the web 27 at the nip 43, as shown in FIGS. 10A and 10B.

In order to hold the components 31, 32 in position on the strippers 57, 58 and dies 45, 46, the wheels 41, 42, 53, 54 are provided with a vacuum means, which may be drawn from any traditional source 60. The vacuum is applied to each wheel 41, 42, 53, 54 through inlet ports 81, 82, 83, 84 in stationary vacuum distributors 71, 72, 73, 74. In order to position the distributors 71, 72, 73, 74 and effect a seal against the wheels 41, 42, 53, 54, the distributors 71, 72, 73, 74 are spring-loaded against each wheel 41, 42, 53, 54 by spring 141 and bracket 142 mechanisms.

So that the distributors 71, 72, 73, 74 may transmit the vacuum to the transfer and die wheels 41, 42, 53, 54, the inlet ports 81, 82, 83, 84 communicate with arcuate channels 91, 92, 93, 94 in the surfaces of the distributors 71, 72, 73, 74 at the interface of the distributors 71, 72, 73, 74 with the wheels 41, 42, 53, 54. To further convey the vacuum to the surface of the stripper 57, 58 or die 45, 46, the wheels 41, 42, 53, 54 have internal ports 101, 102, 103, 104 that extend from the distributor 71, 72, 73, 74/wheel 41, 42, 53, 54 interface to the surface of the stripper 57, 58 or die 45, 46. Consequently, when an eyelet 31 or stud 32 is in position on a stripper 57, 58 or die 45, 46 and the internal port 101, 102, 103, 104 of the wheel 41, 42, 53, 54 is in contact with the channel 91, 92, 93, 94, the component 31, 32 is retained on the stripper 57, 58 or die 45, 46 by a vacuum that is supplied to the stripper 57, 58 or die 45, 46 surface from the vacuum source 60 through the inlet port 81, 82, 83, 84 and the arcuate channel 91, 92, 93, 94. In this way, the length of the arcuate channel 91, 92, 93, 94 controls when the vacuum is applied to the component 31, 32 on the stripper 57, 58 or die 45, 46 from the vacuum source 60.

During operation, a transfer wheel port 103, 104 first communicates with the arcuate channel 93, 94 when the corresponding stripper 57, 58 receives an eyelet 31 or stud 32 from the transfer point 110, 120 at the eyelet magazine 55 or the stud magazine 56, thus holding the component 31, 32 in position on the stripper 57, 58. The transfer wheel port 103, 104 continues to communicate with the arcuate channel 93, 94, as the transfer wheel 53, 54 rotates, so that the vacuum is continuously exerted on the eyelet 31 or stud 32. When the stripper 57, 58 reaches the transfer point 130, 140 at the eyelet die wheel 41 or the stud die wheel 42, the transfer wheel port 103, 104 passes beyond contact with the arcuate channel 93, 94, so that the vacuum is no longer exerted on the eyelet 31 or stud 32. Thus, it is seen that a vacuum is continuously transmitted to retain the component 31, 32 on the stripper 57, 58 from the point when the stripper 57, 58 engages the eyelet 31 or stud 32 at the magazine 55, 56 until the component 31, 32 reaches the transfer point 130, 140 at the respective die wheel 41, 42.

The strippers 57, 58 of the transfer wheels 53, 54 and the dies 45, 46 of the die wheels 41, 42 rotate to the transfer points 130, 140 between the wheels 53 and 41, 54 and 42 as shown in FIGS. 8 and 9, synchronously. To assist in the transfer of the component 31, 32 from the stripper 57, 58 of the transfer wheel 53, 54 to the die 45, 46 of the die wheel 41, 42, the internal ports 101, 102 of the die wheels 41, 42 rotate into communication with the arcuate channels 91, 92 of the stationary die wheel distributors 71, 72; in this way, the vacuum source 60 exerts a retaining vacuum on the eyelet 31 or the stud 32 when the corresponding die 45, 46 reaches the transfer point 130, 140 at the eyelet transfer wheel 53 or the stud transfer wheel 54. In this way, the eyelet 31 is transferred from the eyelet transfer wheel 53 to the eyelet die wheel 41 at the transfer point 130, and the stud 32 is transferred from the stud transfer wheel 54 to the stud die wheel 42 at the transfer point 140.

In order to retain the eyelet 31 on the die 45 as the eyelet die wheel 41 rotates and the stud 32 on the die 46 as the stud die wheel 42 rotates, the internal ports 101, 102 of the die wheels 41, 42 continues to communicate with the arcuate channels 91, 92 of the vacuum distributors 71, 72 to exert a retaining vacuum on the components 31, 32. When the dies 45, 46 supporting the eyelet 31 and stud 32 reach the nip 43 formed between the die wheels 41, 42, the corresponding internal ports 101, 102 pass beyond contact with the arcuate channels 91, 92 so that the vacuum is no longer exerted on the components 31, 32.

In order to facilitate assembly of the eyelet 31 and the stud 32 in the web 27, the web 27 is continuously advanced through the nip 43 formed between the eyelet die wheel 41 and the stud die wheel 42. As shown in FIG. 10A, the eyelet 31 in position on the die 45 of the eyelet die wheel 41, rotating in a counterclockwise direction, and the stud 32 on the die 46 of the stud die wheel 42, rotating in a clockwise direction, move toward the nip 43 in synchronous rotation. It may be appreciated that the web 27 advances through the nip 43 formed between the die wheels 41, 42 at a velocity equal to the tangential velocity of the synchronously rotating die wheels 41, 42. In this way, the stud 32 and the eyelet 31 may be efficiently and accurately assembled in the web 27 moving through the nip 43.

As shown in FIGS. 10A and 10B, the post 49 of the eyelet 31 enters the socket 50 of the synchronously moving stud 32 in assembly at the web 27. So as to create a unitary structure in the web 27 at the nip 43, the post 49 of the eyelet 31 deforms as it rolls into the socket 50 of the stud 32. In this way, the complete assembly of the eyelet 31 and the stud 32 in the web 27 occurs at a single unit 25 without disrupting the continuous movement of the web 27 through the processing operations of a web processing machine 20.

So that the eyelet transfer and die wheels 53, 41 and the stud transfer and die wheels 54, 42 may be rotated synchronously during operation, a single input shaft 105 imparts rotation to one wheel 54 as shown in FIG. 3. In order to synchronously rotate each of the wheels 54, 42, 41, 53, a gear 106 is provided at the base of each wheel, which meshes with the gears 106 at the bases of the adjacent wheels. In this way, the single input 105 to one such wheel 54 is transmitted to each of the wheels 42, 41, 53 to rotate the wheels 54, 42, 41, 53 synchronously.

To briefly summarize the operation of the rotary device for manufacturing eyelet and stud assemblies, conventional rotating or vibrating bowl feeders supply and properly orient eyelets and studs in magazines. Strippers on eyelet and stud transfer wheels strip eyelets and studs from pickup points at the bases of the eyelet and stud magazines, respectively. Strippers, which properly orient and support the eyelets and studs on the rotating transfer wheels, transport the eyelets and studs to transfer points at the eyelet and stud die wheels. The eyelets and studs transfer from the strippers of the transfer wheels to the dies of the eyelet and stud die wheels. The eyelets and studs are retained on the strippers and dies by a vacuum supplied through internal channels and ports. The die wheels, supporting the eyelets and studs on dies about its periphery, rotate to assemble the eyelets and studs in a web moving continuously through the nip formed between the die wheels. In this way, it may be seen that the rotary device provides a versatile, simplified assembly method, which may be efficiently adapted to a highly automated processing unit.

We claim as our invention:

1. A machine for deforming a stud and an eyelet through a web so as to create a unitary structure comprising the stud, the eyelet and the web, which comprises:
   a stud die wheel having dies spaced about the circumference of the wheel for receiving the stud,
   an eyelet die wheel having dies spaced about the circumference of the wheel for receiving the eyelet,
   a supply means for supplying studs and eyelets to the stud die wheel and the eyelet die wheel,
   said stud and said eyelet die wheels positioned adjacently, thereby providing a nip therebetween so that said stud and said eyelet on said dies meet and deform at the nip,
   a suction means for holding the stud or eyelet on the respective die,
   a drive means for synchronously rotating the wheels, and
   a means for continuously moving a web through a nip of the two wheels.

2. A machine as claimed in claim 1, wherein the supply means includes:
   a magazine that continuously supplies studs to a stud transfer wheel,
   said stud transfer wheel having a stripper means for receiving the stud from the magazine,
   said stripper means having a suction means for holding the stud on the stripper,
   the stud strippers of the stud transfer wheel having a transfer point at the stud die wheel; and
   a magazine that continuously supplies eyelets to an eyelet transfer wheel,
   said eyelet transfer wheel having a stripper means for receiving the eyelet from the magazine,
   said stripper means having a suction means for holding the eyelet on the stripper,
   the eyelet strippers of the eyelet transfer wheel having a transfer point at the eyelet die wheel.

3. A machine as claimed in claim 2, wherein:
   each transfer wheel has internal ports that connect the stripper and the stud or eyelet interface with the upper face of the wheel; and
   the suction means includes a stationary vacuum distributor plate situated on the upper face of each transfer wheel,
   each vacuum distributor plate having a vacuum supply source and an arcuate channel along the lower face of the plate in contact with the upper face of the adjacent transfer wheel,
   such that the vacuum supply source communicates with the arcuate channel and the arcuate channel further communicates with the ports in the transfer wheel so that the vacuum means operates when the stripper comes in contact with the stud or the eyelet at the magazine, and the vacuum does not operate when the stud or the eyelet reaches the transfer point at a die of the die wheel;
   each die wheel has internal ports that connect the die and the stud or eyelet interface with the upper face of the wheel; and
   the suction means includes a stationary vacuum distributor plate situated on the upper face of each die wheel,
   each vacuum distributor plate having a vacuum supply source and an arcuate channel along the lower face of the plate in contact with the upper face of the adjacent die wheel,
   such that the vacuum supply source communicates with the arcuate channel and the arcuate channel further communicates with the ports in the die wheel so that the vacuum means operates when the die reaches the transfer point at the stud or eyelet held on the stripper of the transfer wheel, and the vacuum does not operate when the stud and the eyelet have been assembled and deformed to form a unitary structure in the web at the nip.

4. A machine as claimed in claim 2, wherein the drive means further comprises:
   gears at the bases of each wheel which mesh together, and
   a single input shaft that imparts rotation to one such wheel gear.

5. A machine as claimed in claim 1, wherein:
   each die wheel has internal ports that connect the die and the stud or eyelet interface with the upper face of the wheel; and
   the suction means includes a stationary vacuum distributor plate situated on the upper face of each die wheel,
   each vacuum distributor plate having a vacuum supply source and an arcuate channel along the lower face of the plate in contact with the upper face of the adjacent die wheel,
   such that the vacuum supply source communicates with the arcuate channel and the arcuate channel further communicates with the ports in the die wheel so that the vacuum means operates when the die reaches a transfer point at the stud or the eyelet at the supply source, and the vacuum does not operate when the stud and the eyelet have been assembled and deformed to form a unitary structure in the web at the nip.

6. A machine as claimed in claim 5, wherein:
   the eyelet and/or the stud are plastically deformed to form a unitary structure in the web at the nip.

7. A machine as claimed in claim 5, wherein:
   the eyelet and/or the stud are plastically deformed to form a unitary structure in the web at the nip.

8. A machine as claimed in claim 1, wherein the drive means further comprises:
   gears at the bases of each wheel which mesh together, and
   a single input shaft that imparts rotation to one such wheel gear.

9. A machine for deforming a stud and an eyelet through a web so as to create a unitary structure comprising the stud, the eyelet, and the web, which comprises:
   a stud magazine that continuously supplies studs to a stud transfer wheel,
   a stud die wheel, said stud die wheel having a stud transfer point at said stud transfer wheel,
   an eyelet magazine that continuously supplies eyelets to an eyelet transfer wheel,
   an eyelet die wheel, said eyelet die wheel having an eyelet transfer point at said eyelet transfer wheel,
   said stud and said eyelet die wheels positioned adjacently providing a nip therebetween so that the stud and the eyelet on said dies meet and deform at the nip, each said wheel having a gear at the base of the wheel, said gears situated so that they mesh together, a drive means which imparts rotation to one such wheel gear to synchronously rotate the wheels, a means for advancing said web between the die wheels synchronously with the rotation of the wheels, said stud transfer wheel having a stripper means for receiving the stud from the magazine, said stud transfer wheel further having ports at the stripper and the stud interface;

said eyelet transfer wheel having a stripper means for receiving the eyelet from the magazine, said eyelet transfer wheel further having ports at the stripper and the eyelet interface;

said stud die wheel having dies spaced about the circumference of the wheel for receiving the stud, said stud die wheel having ports at the die and the stud interface;

said eyelet die wheel having dies spaced about the circumference of the wheel for receiving the eyelet, said eyelet die wheel having ports at the die and the eyelet interface;

a vacuum means for holding the stud or the eyelet on the stripper or the die on the transfer and die wheels, said vacuum in the transfer wheels being operative through the ports when the stripper comes in contact with the stud or the eyelet at the magazine, and the vacuum does not operate through the ports when the stud or eyelet reaches the transfer point at a die of the die wheel, said vacuum in the die wheels being operative when the die of the die wheel reaches the transfer point at the stud or eyelet on the stripper of the transfer wheel, and the vacuum does not operate when the stud and the eyelet have been assembled and deformed to form a unitary structure in the web at the nip.

10. A method of manufacturing a stud and eyelet assembly, which comprises:
supplying a stud to a stud die wheel having dies spaced about the circumference of the wheel for receiving the stud,
supplying an eyelet to an eyelet die wheel having dies spaced about the circumference of the wheel for receiving the eyelet,
receiving the stud and the eyelet on the dies on the respective wheels,
holding the stud and the eyelet on the respective dies by a suction means,
synchronously rotating the wheels supporting the stud and the eyelet on the respective dies so that the stud and the eyelet meet at a nip of the stud die wheel and the eyelet die wheel,
advancing a web between the two wheels at the nip, and
deforming the stud and the eyelet at the nip so as to create a unitary structure comprising the stud, eyelet and web.

11. A manufacturing method, as recited in claim 1, wherein the deforming step includes:
deforming the eyelet and/or the stud plastically so that the eyelet and the stud are permanently joined at the nip to create a unitary structure.

12. A manufacturing method, as recited in claim 10, wherein the holding step includes:
applying a vacuum from the suction means on each wheel through ports connecting a vacuum distributor with the die and the stud or eyelet interface,
said suction means being operative when the die comes in contact with the stud or the eyelet at the supply source, and being released when the eyelet and the stud have been assembled and deformed in the web.

13. A manufacturing method, as recited in claim 12, wherein the holding step includes:
applying a vacuum from the suction means through a stationary vacuum distributor plate having an arcuate channel that communicates with ports in the rotating die wheel to supply the vacuum to the die and stud or eyelet interface.

14. A manufacturing method as recited in claim 13, wherein the deforming step includes:
deforming the eyelet and/or the stud plastically so that the eyelet and the stud are permanently joined at the nip to create a unitary structure.

15. A manufacturing method, as recited in claim 13, wherein the deforming step includes:
deforming the eyelet and/or the stud plastically so that the eyelet and the stud are permanently joined at the nip to create a unitary structure.

16. A manufacturing method as recited in claim 10, wherein the supplying step includes:
supplying the stud or eyelet from a magazine to a transfer wheel having strippers spaced about the circumference of the wheel for receiving the stud or eyelet from the magazine,
holding the stud or the eyelet on the stripper by a suction means,
rotating said transfer wheel to bring the stud or eyelet on the stripper to a transfer point at the stud or eyelet die on the die wheel, and
transferring said stud or eyelet from the stripper to the die wheel.

17. A manufacturing method as recited in claim 16, wherein the holding step includes:
applying a vacuum from the suction means on each wheel through ports connecting a vacuum distributor with the die or stripper and the stud or eyelet interface,
said suction means of the transfer wheel being operative when the stripper comes in contact with the stud or the eyelet at the supply source and being released when the stud or eyelet reaches the transfer point at a die on the die wheel, and
said suction means of the die wheel being operative when the die reaches the transfer point at the stud or the eyelet on the transfer wheel and being released when the stud and the eyelet have been assembled and deformed in the web at the nip.

18. A manufacturing method as recited in claim 17, wherein the holding step includes:
applying a vacuum from the suction means through a stationary vacuum distributor plate on each die wheel having an arcuate channel that communicates with ports in the rotating die wheel to supply the vacuum to the die and stud or eyelet interface, and
applying a vacuum from the suction means through a stationary vacuum distributor plate on each transfer wheel having an arcuate channel that communicates with ports in the rotating transfer wheel to supply the vacuum to the stripper and the stud or eyelet interface.

19. A manufacturing method, as recited in claim 18, wherein the deforming step includes:

deforming the eyelet and/or the stud plastically so that the eyelet and the stud are permanently joined at the nip to create a unitary structure.

20. A manufacturing method as recited in claim 18, wherein the rotating step includes:

rotating the wheels synchronously by inputting a single drive means to a gear at the base of one wheel, which meshes with a gear at the base at the other wheel.

21. A manufacturing method as recited in claim 16, wherein the rotating step includes:

rotating the wheels synchronously by inputting a single drive means to a gear at the base of one wheel, which meshes with gears at the bases of the other wheels.

* * * * *

UNITED STATES PATENT AND TRADEMARK OFFICE
CERTIFICATE OF CORRECTION

PATENT NO. : 4,817,261
DATED : April 4, 1989
INVENTOR(S) : Robert W. Sessions and Richard A. Rodzen It is certified that error appears in the above—identified patent and that said Letters Patent is hereby corrected as shown below:

Column 2, line 18, change "nip for" to -- nip formed between --;

Column 2, line 30, change "FIG. 6A" to -- FIG. 7A --;

Column 2, line 38, change "cross-sec" to -- cross-sectional --.

Column 3, line 29, change "FIGS. 2 and," to -- FIGS. 2 and 3, --.

Signed and Sealed this

Fifth Day of May, 1992

Attest:

DOUGLAS B. COMER

*Attesting Officer*     *Acting Commissioner of Patents and Trademarks*